(12) United States Patent
Lee et al.

(10) Patent No.: US 10,501,610 B2
(45) Date of Patent: Dec. 10, 2019

(54) METHOD FOR PREPARING STYRENE-BUTADIENE RUBBER AND STYRENE-BUTADIENE RUBBER

(71) Applicant: LG Chem, Ltd., Seoul (KR)

(72) Inventors: Jae Min Lee, Daejeon (KR); Se Eun Lee, Daejeon (KR); Byoung Yun Kim, Daejeon (KR); In Sung Jo, Daejeon (KR); Woo Seok Choi, Daejeon (KR)

(73) Assignee: LG Chem, Ltd. (KR)

( * ) Notice: Subject to any disclaimer, the term of this patent is extended or adjusted under 35 U.S.C. 154(b) by 4 days.

(21) Appl. No.: 15/741,538

(22) PCT Filed: Dec. 28, 2016

(86) PCT No.: PCT/KR2016/015423
§ 371 (c)(1),
(2) Date: Jan. 3, 2018

(87) PCT Pub. No.: WO2017/116145
PCT Pub. Date: Jul. 6, 2017

(65) Prior Publication Data
US 2018/0215902 A1  Aug. 2, 2018

(30) Foreign Application Priority Data

Dec. 28, 2015  (KR) .................. 10-2015-0187671
Dec. 28, 2016  (KR) .................. 10-2016-0181187

(51) Int. Cl.
| | | |
|---|---|---|
| C08L 9/06 | (2006.01) |
| C08F 236/10 | (2006.01) |
| C08K 5/37 | (2006.01) |
| C08F 2/22 | (2006.01) |
| C08F 2/38 | (2006.01) |

(52) U.S. Cl.
CPC ................... *C08L 9/06* (2013.01); *C08F 2/22* (2013.01); *C08F 2/38* (2013.01); *C08F 236/10* (2013.01); *C08K 5/37* (2013.01); *C08F 2500/02* (2013.01); *C08F 2800/20* (2013.01)

(58) Field of Classification Search
CPC ............... C08F 2/22; C08F 2/38; C08K 5/37
See application file for complete search history.

(56) References Cited

U.S. PATENT DOCUMENTS

| | | | |
|---|---|---|---|
| 3,563,946 A | 2/1971 | Miller et al. | |
| 3,575,913 A | 4/1971 | Meier | |
| 3,927,142 A * | 12/1975 | Strobel | C08F 255/06 |
| | | | 525/243 |
| 5,807,941 A | 9/1998 | Tsuji et al. | |
| 6,342,559 B1 | 1/2002 | Takagishi | |
| 6,642,315 B2 | 11/2003 | Amino et al. | |
| 6,649,724 B2 | 11/2003 | Nakamura et al. | |
| 2007/0167555 A1* | 7/2007 | Amino | B60C 1/00 |
| | | | 524/495 |
| 2013/0066011 A1 | 3/2013 | Fouchet et al. | |
| 2016/0185890 A1 | 6/2016 | Yoshimura | |

FOREIGN PATENT DOCUMENTS

| | | |
|---|---|---|
| CN | 1922258 A | 2/2007 |
| CN | 103059222 A | 4/2013 |
| CN | 103450396 A | 12/2013 |
| KR | 19990077755 A | 10/1999 |
| KR | 101484380 B1 | 1/2015 |
| WO | 2015046559 A1 | 4/2015 |

OTHER PUBLICATIONS

Minozzi et al., "tert-Dodecanethiol", Encyclopedia of Reagents for Organic Synthesis, p. 1-3 (2008).*
Search report from International Application No. PCT/KR2016/015423, dated Apr. 3, 2017.
Extended European Search Report and Written Opinion for EP Application No. 16882097.5, dated Aug. 29, 2018.
Chinese Search Report for Application No. 201680043640.8, dated Jul. 17, 2019, p. 1-2.
Kathrin-Maria Roy, Thiols and Organic Sulfides, Ullmann's Encyclopedia of Industrial Chemistry, Jun. 2000, pp. 629-655, vol. 36, Wiley-VCH Verlag GmbH & Co. KGaA.

* cited by examiner

*Primary Examiner* — Jeffrey C Mullis
(74) *Attorney, Agent, or Firm* — Lerner, David, Littenberg, Krumholz & Mentlik, LLP

(57) ABSTRACT

The present invention relates to a method for preparing styrene-butadiene rubber in which a molecular weight modifier containing two or more components is used in a polymerization reaction and each of the two or more components is added at a optimal time, and the method is capable of improving physical properties of the prepared styrene-butadiene rubber, and styrene-butadiene rubber prepared thereby. The styrene-butadiene rubber prepared according to the preparation method of the present invention has improvement in characteristics such as tensile strength, elongation, etc., and thus may be usefully used in the production of a tire having environmental friendliness, abrasion resistance, and the like.

8 Claims, 1 Drawing Sheet

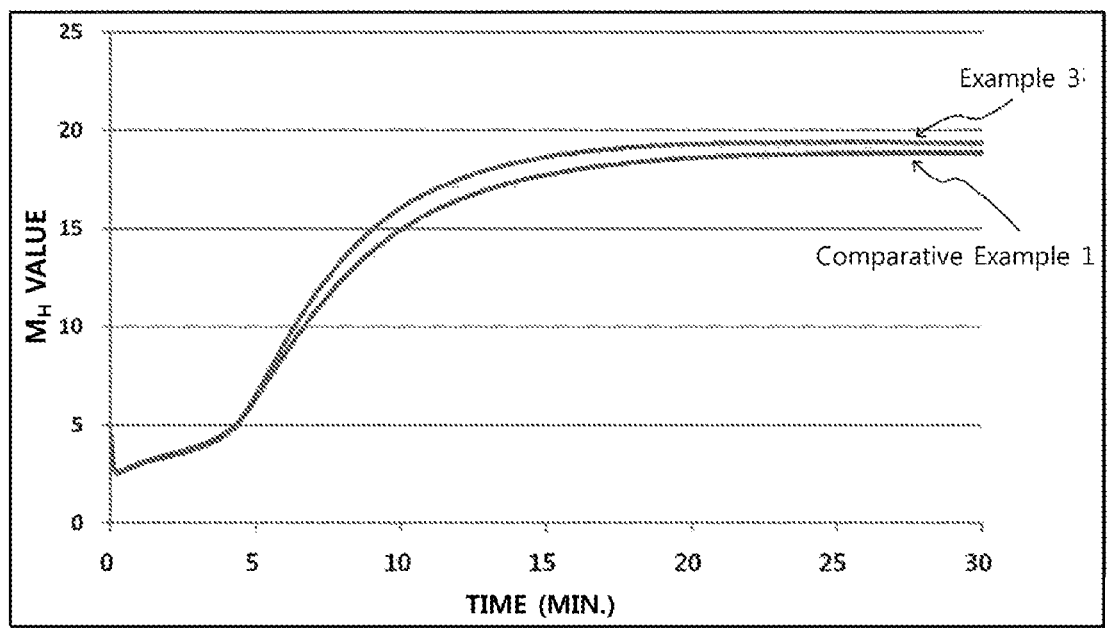

METHOD FOR PREPARING STYRENE-BUTADIENE RUBBER AND STYRENE-BUTADIENE RUBBER

CROSS-REFERENCE TO RELATED APPLICATIONS

The present application is a national phase entry under 35 U.S.C. § 371 of International Application No. PCT/KR2016/015423 filed on Dec. 28, 2016, which claims priority from Korean Patent Application Nos. 10-2015-0187671 filed on Dec. 28, 2015, and 10-2016-0181187 filed on Dec. 28, 2016, the entire contents of which are incorporated herein by reference.

TECHNICAL FIELD

The present invention relates to a method for preparing styrene-butadiene rubber and styrene-butadiene rubber prepared by same, and more particularly, to a method for preparing styrene-butadiene rubber in which a molecular weight modifier including two or more components is used in a polymerization reaction and each of the two or more components is added at a optimal time, and the method is capable of improving physical properties of the prepared styrene-butadiene rubber, and styrene-butadiene rubber prepared thereby.

BACKGROUND ART

Styrene-butadiene rubber obtained by emulsion polymerization is synthetic rubber most widely used in the production of tires and has properties such as flat vulcanizability, stable scorch, high processability, etc.

Recently, in relation to energy efficiency, automobile fuel regulations such as the EU labeling system have been tightened, and thus research on styrene-butadiene rubber materials that can exhibit environmental friendliness, abrasion resistance and the like as a material of a tire is getting more attention.

As techniques for emulsion copolymers, various patents regarding methods of preparing styrene-butadiene copolymers or styrene-butadiene-polar monomer copolymers have been published.

For example, U.S. Pat. Nos. 3,575,913 and 3,563,946 disclose that styrene-butadiene or styrene-butadiene-acrylate copolymers are prepared with potassium persulfate or azobisisobutyronitrile in an emulsion state. Also, Patent Publication No. 1999-0077755 discloses an emulsion styrene-butadiene rubber which may be used in the production of tire treads having rolling resistance with improved traction characteristics and treadwear characteristics, and a production method thereof.

In such related art polymerization of styrene-butadiene rubber, t-dodecylmercaptan (t-DDM) is used as a molecular weight modifier, which is composed of a mixture of 35 isomers due to characteristics of the production mechanism thereof, and thus when polymerization of styrene-butadiene rubber is performed with t-dodecylmercaptan, the related art polymerization has a drawback in that it has a bad influence on the final physical properties of prepared styrene-butadiene rubber.

Accordingly, there are needs for a novel method for preparing styrene-butadiene rubber that may address the drawback of t-dodecylmercaptan, and for development of styrene-butadiene rubber with physical properties improved therethrough.

DISCLOSURE OF THE INVENTION

Technical Problem

The present invention is to provide a method for preparing styrene-butadiene rubber which may improve physical properties of styrene-butadiene rubber prepared with a molecular weight modifier including two or more components, each component of the molecular weight modifier being added at an optimal time.

The present invention also provides styrene-butadiene rubber which is prepared by the foregoing method and has improved physical properties.

Technical Solution

According to an aspect of the present invention, there is provided a method for preparing styrene-butadiene rubber (SBR) by polymerization in an emulsion state by using a composition including 1) a styrene-based monomer; 2) a butadiene-based monomer; and 3) a molecular weight modifier comprising t-dodecylmercaptan and pentamethylheptanethiol (PMHT), wherein the t-dodecylmercaptan and the pentamethylheptanethiol are included in a weight ratio of 70:30 to 95:5, and the pentamethylheptanethiol is added at a time when the polymerization exhibits a conversion rate of 10% to 55%.

According to another aspect of the present invention, there is provided styrene-butadiene rubber which is prepared by the foregoing method and has a tensile strength (TS) ranging from 250 kg·f/cm$^2$ to 300 kg·f/cm$^2$, and a tensile elongation (s) ranging from 370% to 400%.

Advantageous Effects

A method for preparing styrene-butadiene rubber according to the present invention is capable of improving the physical properties of the prepared styrene-butadiene rubber by employing a molecular weight modifier including two or more components, each component being added at an optimal time. Consequently, the styrene-butadiene rubber prepared by the foregoing method exhibits improvement in properties such as tensile strength, tensile elongation, etc. and thus may be usefully employed in the production of tires with environmental friendliness, abrasion resistance, etc.

BRIEF DESCRIPTION OF THE DRAWINGS

FIG. 1 is a graph showing $M_H$ values according to time in preparing methods of Example 3 and Comparative Example 1.

BEST MODE FOR CARRYING OUT THE INVENTION

Hereinafter, the present invention will be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

According to the present invention, there is disclosed a method for preparing styrene-butadiene rubber (SBR) by polymerization in an emulsion state, of a composition including: 1) a styrene-based monomer; 2) a butadiene-based monomer; and 3) a molecular weight modifier comprising t-dodecylmercaptan and pentamethylheptanethiol (PMHT), wherein the t-dodecylmercaptan and the pentamethylheptanethiol are included in a weight ratio of 70:30 to 95:5, and the pentamethylheptanethiol is added at a time when the polymerization exhibits a conversion rate of 10% to 55%.

1) Styrene-Based Monomer

The styrene-based monomer may be at least one selected from the group consisting of styrene, monochlorostyrene, methylstyrene, α-methylstyrene, divinylbenzene, p-tert-styrene, and dimethylstyrene.

The styrene-based monomer may be 10 weight % to 60 weight %, and specifically 15 weight % to 50 weight % based on the total weight of the all the monomers. When the styrene-based monomer is less than 10 weight %, mechanical properties including the tensile property of the prepared styrene-butadiene rubber may be deteriorated, and when the styrene-based monomer exceeds 60 weight %, elasticity and abrasion resistance of the prepared styrene-butadiene rubber may be deteriorated.

2) Butadiene-Based Monomer

The butadiene-based monomer may be at least one selected from the group consisting of 1,3-butadien, 1,4-butadien, 2,3-dimethyl-1,3-butadien, 2-ethyl-1,3-butadien, 1,3-pentadiene, and isoprene.

The butadiene-based monomer may be 40 weight % to 90 weight %, specifically 50 weight % to 85 weight % based on the total weight of the all the monomers. When the butadiene-based monomer is less than 40 weight %, a problem may occur in which the elasticity and abrasion resistance of the prepared styrene-butadiene rubber are deteriorated, and when the butadiene-based monomer exceeds 90 weight %, mechanical properties including the tensile property of the prepared styrene-butadiene rubber may be deteriorated.

In copolymers constituting the prepared styrene-butadiene rubber, the butadiene unit may have at least one structure selected from the group consisting of trans, cis, and vinyl groups.

3) Molecular Weight Modifier Comprising t-Dodecylmercaptan and Pentamethylheptanethiol (PMHT)

The molecular weight modifier includes t-dodecylmercaptan and pentamethylheptanethiol (PMHT), and the t-dodecylmercaptan and the pentamethylheptanethiol (PMHT) are included in a weight ratio of 70:30 to 95:5.

The t-dodecylmercaptan may be prepared by the following Formula 1 and includes at least 35 isomers in a preparation method thereof:

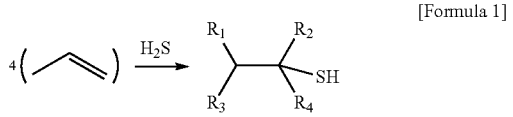

[Formula 1]

In Formula 1, $R_1$ to $R_4$ are each independently alkyl groups, and the sum of carbons in the $R_1$ to $R_4$ is 10.

The pentamethylheptanethiol (PMHT) may include at least one selected from the group consisting of 2,2,4,6,6-pentamethylheptane-4-thiol, 2,4,4,6,6-pentamethylheptane-2-thiol, 2,3,4,6,6-pentamethylheptane-2-thiol, and 2,3,4,6,6-pentamethylheptane-3-thiol.

Also, the pentamethylheptanethiol may include the 2,2,4,6,6-pentamethylheptane-4-thiol in an amount of 65 mol % or more based on the total mole number of the pentamethylheptanethiol.

The pentamethylheptanethiol may be prepared by the following Formula 2 and may include the 2,2,4,6,6-pentamethylheptane-4-thiol in an amount of 65 mol % or more based on the total mole number of the pentamethylheptanethiol in a preparation method thereof:

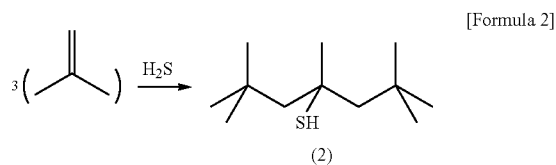

[Formula 2]

In the molecular weight modifier used in the preparation method of styrene-butadiene rubber according to the present invention, since the t-dodecylmercaptan and the pentamethylheptanethiol are included to satisfy the weight ratios of 70:30 to 95:5 and the pentamethylheptanethiol comprises the 2,2,4,6,6-pentamethylheptane-4-thiol in an amount of 65 mol % or more based on the total mole number of the pentamethylheptanethiol, the single isomer of 2,2,4,6,6-pentamethylheptane-4-thiol occupies the largest fraction of the molecular weight modifier, thereby allowing the prepared styrene-butadiene rubber to have uniform physical properties, and is thus capable of increasing the physical properties such as tensile strength, tensile elongation and the like of the styrene-butadiene rubber.

Also, the t-dodecylmercaptan and the pentamethylheptanethiol may be contained specifically in a weight ratio of more than 70:less than 30 to less than 95:more than 5, more specifically in a weight ratio of 80:20 to less than 95:more than 5, and still more specifically in a weight ratio of 80:20 to 90:10.

Meanwhile, the molecular weight modifier may comprise the 2,2,4,6,6-pentamethylheptane-4-thiol in an amount of 5 mol % or more, specifically 5 mol % to 50 mol % based on the total mole number of the molecular weight modifier.

The composition may comprise the molecular weight modifier in an amount of 0.01 to 2 parts by weight, specifically 0.05 to 2 parts by weight, and more specifically 0.1 to 1 part by weight based on 100 parts by weight of the composition.

The average molecular weight of the styrene-butadiene rubber may be controlled according to the amount of the molecular weight modifier, and in the case where the molecular weight modifier is used in a small amount close to 0.01 parts by weight based on 100 parts by weight of the composition, the prepared styrene-butadiene rubber may have a high molecular weight, and in the case where the molecular weight modifier is used in a large amount close to 2 parts by weight, the prepared styrene-butadiene rubber may have a low molecular weight. When the content of the molecular weight modifier is less than 0.01 parts by weight, gelation may occur, and when the content of the molecular weight modifier exceeds 2 parts by weight, the physical properties of the prepared styrene-butadiene rubber may be deteriorated.

In the preparation method of styrene-butadiene rubber according to the present invention, the composition including the molecular weight modifier comprising: 1) styrene-based monomers; 2) butadiene-based monomers; and 3)

t-dodecylmercaptan and pentamethylheptanethiol (PMHT) may be radically polymerized in an emulsion state.

The radical polymerization may be conducted at a temperature of 5° C. to 90° C., specifically at a temperature of 10° C. to 50° C., for 2 hours to 72 hours, specifically for 4 hours to 48 hours.

When the temperature for the radical polymerization is less than 5° C., it is difficult for the reaction to reach activation, and when the temperature exceeds 90° C., a gel may be formed.

In the preparation method of styrene-butadiene rubber according to the present invention, the t-dodecylmercaptan and the pentamethylheptanethiol (PMHT) contained in the molecular weight modifier may be separately added according to the progress of the polymerization reaction, and specifically, the t-dodecylmercaptan may be added at an early stage of the reaction and the pentamethylheptanethiol (PMHT) may be added after the polymerization reaction has started.

The pentamethylheptanethiol (PMHT) may be added at a time when the polymerization reaction exhibits a conversion rate of 10% to 55%, specifically a conversion rate of 15% to 50%, and more specifically a conversion rate of 15% to 45%.

When the pentamethylheptanethiol (PMHT) is added at a suitable time after the start of the polymerization reaction, that is, at a time at which a conversion of 10% to 55% is exhibited, the use of only a small amount of pentamethylheptanethiol (PMHT) allows the styrene-butadiene rubber prepared according to the use of a single isomer to have uniform physical properties similar to those obtained when a large amount of a single isomer of 2,2,4,6,6-pentamethylheptane-4-thiol is added, and thus high improvement effects in physical properties such as tensile strength and tensile elongation can be exhibited.

When the pentamethylheptanethiol (PMHT) is added at a time at which a conversion rate of less than 10% is exhibited, the improvement of the vulcanization rate and the improvement of the tensile strength may be insufficient, and when the pentamethylheptanethiol (PMHT) is added at a time at which a conversion rate exceeding 55% is exhibited, the effect of controlling the molecular weight may be insignificant due to gel formation.

Meanwhile, in the preparation method of styrene-butadiene rubber according to the present invention, the composition may further comprise an acrylonitrile-based monomer in addition to 1) the styrene-based monomer and 2) the butadiene-based monomer.

The acrylonitrile-based monomer may be at least one selected from methacrylonitrile, ethacrylonitrile, α-chloronitrile, α-cyanoethylacrylonitrile, and crotononitrile. The acrylonitrile-based monomer may be used in an amount of 0.01 to 10 parts by weight based on 100 parts by weight of the total amount of all the monomers. When the amount is 0.01 parts by weight or more, the styrene-butadiene copolymer may exhibit hydrophilicity, and when the amount is 10 parts by weight or less, problems, in which the elasticity decreases or the strength increases enough to cause problems in processability, may be prevented.

In addition, the composition may further comprise a radical initiator, an emulsifier, a polymerization terminator and the like, as needed.

The radical initiator may be an inorganic peroxide such as sodium persulfate, potassium persulfate, ammonium persulfate, potassium perphosphate, or hydrogen peroxide, an organic peroxide such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, or t-butyl peroxy isobutyrate, or a nitrogen compound such as azobisisobutyronitrile, azobis-2,4-dimethylvaleronitrile, azobiscyclohexanecarbonitrile, or azobisisobutyric acid (butyl acid) methyl. The above-mentioned polymerization initiator may be used one or in a combination of two or more kinds thereof.

The radical initiator may be used in an amount of 0.01 parts by weight to 3 parts by weight, specifically 0.02 parts by weight to 1 part by weight, more specifically 0.05 parts by weight to 0.5 parts by weight, based on 100 parts by weight of the total weight of the composition.

When the radical initiator is used in an amount of 0.01 parts by weight or more based on 100 parts by weight of the total weight of the composition, a sufficient polymerization reaction can be performed, and when the radical initiator is used in an amount of 3 parts by weight or less, a polymer having a desired molecular weight can be more suitably produced.

The emulsifier may be an anion, a cation, a nonionic surfactant or the like, and specifically may be at least one selected from metal salts and ammonium salts. Specific examples of the emulsifier are at least one selected from the group consisting of alkyl sulfate metal salts, alkylallyl sulfonic acid metal salts, alkyl phosphate metal salts, alkyl sulfate ammonium salts, alkylallyl sulfonic acid ammonium salts, alkylaryl sulfonic acid ammonium salts, allylsulfonic acid ammonium salts, and alkylphosphate ammonium salts, and more specifically may be at least one selected from the group consisting of dodecylbenzenesulfonic acid, rosin acid, fatty acid, lauryl sulfonic acid, and hexadecylsulfonic acid.

In this case, the alkyl, allyl and aryl each may have 5 to 20 carbon atoms independently, and when the number of carbon atoms is less than 5, a problem in the role thereof as a dispersant may occur, and when the number of carbon atoms exceeds 20, the hydrophilicity of the styrene-butadiene copolymer may be deteriorated.

The emulsifier may be used in an amount of 0.1 parts by weight to 10 parts by weight, specifically in an amount of 0.5 parts by weight to 10 parts by weight, based on 100 parts by weight of the total weight of the composition.

When the amount of the emulsifier is less than 0.1 parts by weight, micelles may not be formed, and when the amount of the emulsifier exceeds 10 parts by weight, a microemulsion may be formed and thus there may occur a problem in which molecules having low molecular weights are generated.

Examples of the polymerization terminator include diethylhydroxyamine, N-isopropylhydroxyamine, monoethylhydroxyamine, sodium dimethyldithiocarbamate or the like.

The polymerization terminator may be used in an amount of 0.01 to 2 parts by weight based on 100 parts by weight of the total weight of the composition, and when the amount of the polymerization terminator is less than 0.01 parts by weight, the effect of stopping the reaction may be insufficient and a gel may be formed. Also, the polymerization terminator is harmful to the human body and is preferably used in an amount of 2 parts by weight or less, and if used in excess, a problem may occur in which an odor is generated due to an unreacted polymerization terminator.

In the method for preparing styrene-butadiene rubber according to an example of the present invention, processes other than the process of adding the molecular weight modifier may be performed by the emulsion polymerization processes commonly used in the art, and the mixing of 1) the styrene-based monomer; 2) the butadiene monomer; and the t-dodecylmercaptan among the molecular weight modifiers is not particularly limited, and these components may be added to a polymerization reactor, simultaneously or successively.

The styrene-butadiene rubber prepared according to the preparation method of the styrene-butadiene rubber may be further subject to washing and drying steps for removing impurities (residual emulsifying agent, coagulant, etc.) from a coagulate of a prepared styrene-butadiene copolymer to obtain styrene-butadiene rubber.

The styrene-butadiene rubber prepared according to the polymerization method of the styrene-butadiene rubber of the present invention may have a tensile strength (TS) of 250 kg·f/cm$^2$ to 300 kg·f/cm$^2$, and a tensile elongation (s) of 370% to 400%.

Further, the styrene-butadiene rubber may have a 300% modulus value of 190 to 200.

The styrene-butadiene copolymer may have a weight average molecular weight of 200,000 g/mol to 3,000,000 g/mol, and specifically 500,000 g/mol to 2,000,000 g/mol.

When the weight average molecular weight is less than 200,000 g/mol, physical properties may be deteriorated, and when the weight average molecular weight is more than 3,000,000 g/mol, there may be a problem in which the styrene-butadiene copolymer is difficult to process due to generation of a gel and a high hardness.

EXAMPLES

Hereinafter, the present invention will be described in more detail by the following Examples and Experimental Examples. However, the Examples and the Experimental Examples are provided to illustrate the present invention, and the scope of the present invention is not limited thereto.

Example 1

29 parts by weight of styrene, 71 parts by weight of 1,3-butadiene, 178 parts by weight of water, 0.05 parts by weight of an initiator (p-menthane hydroperoxide), 5 parts by weight of wood rosin acid-fatty acid emulsifier (weight ratio of wood rosin acid:C$_{12-18}$ hydrogenated mixed fatty acid=50:50), and 0.45 part by weight (corresponding to 90 weight % of 0.5 parts by weight, which is the total amount of the molecular weight modifier added) of t-dodecylmercaptan (ISU chemical) as a molecular weight modifier were added to a 6 L pressure reactor at 10° C., and a polymerization reaction was initiated.

At the time when the conversion rate reached 15%, 0.05 parts by weight (corresponding to 10 weight % of 0.5 parts by weight, which is the total amount of the molecular weight modifier added) of pentamethylheptanethiol (TIB-TDM, Chevron Phillips, containing at least 65 mol % of 2,2,4,6,6-pentamethylheptane-4-thiol and 35 mol % of the other isomers) containing at least 65 mol % of 2,2,4,6,6-pentamethylheptane-4-thiol as a molecular weight modifier was further added. At the time when the conversion rate reached 63%, the polymerization reaction was terminated and the reaction time was 7 hours.

Example 2

Styrene-butadiene rubber was prepared by the same method as that in Example 1 except that the pentamethylheptanethiol was added at the time at which a conversion rate of 30% was exhibited.

Example 3

Styrene-butadiene rubber was prepared by the same method as that in Example 1 except that the pentamethylheptanethiol was added at the time at which a conversion rate of 45% was exhibited.

Example 4

Styrene-butadiene rubber was prepared by the same method as that in Example 1 except that the pentamethylheptanethiol was added at the time at which a conversion rate of 50% was exhibited.

Example 5

Styrene-butadiene rubber was prepared by the same method as that in Example 1 except that as a molecular weight modifier, the amount of the t-dodecylmercaptan (ISU chemical) was changed to 0.475 parts by weight (corresponding to 95 weight % of 0.5 parts by weight, which is the total amount of the molecular weight modifier added) and the amount of the pentamethylheptanethiol was changed to 0.025 parts by weight (corresponding to 5 weight % of 0.5 parts by weight, which is the total amount of the molecular weight modifier added).

Example 6

Styrene-butadiene rubber was prepared by the same method as that in Example 1 except that as a molecular weight modifier, the amount of the t-dodecylmercaptan (ISU chemical) was changed to 0.35 parts by weight (corresponding to 70 weight % of 0.5 parts by weight, which is the total amount of the molecular weight modifier added) and the amount of the pentamethylheptanethiol was changed to 0.15 parts by weight (corresponding to 30 weight % of 0.5 parts by weight, which is the total amount of the molecular weight modifier added).

Comparative Example 1

Styrene-butadiene rubber was prepared by the same method as that in Example 1 except that as a molecular weight modifier, only 0.5 parts by weight of the t-dodecylmercaptan was added and the pentamethylheptanethiol was not added.

Comparative Example 2

Styrene-butadiene rubber was prepared by the same method as that in Example 1 except that as a molecular weight modifier, the amount of the t-dodecylmercaptan (ISU chemical) was changed to 0.3 parts by weight (corresponding to 60 weight % of 0.5 parts by weight, which is the total amount of the molecular weight modifier added) and the amount of the pentamethylheptanethiol was changed to 0.2 parts by weight (corresponding to 40 weight % of 0.5 parts by weight, which is the total amount of the molecular weight modifier added).

Comparative Example 3

Styrene-butadiene rubber was prepared by the same method as that in Example 1 except that the pentamethylheptanethiol was added at the time at which a conversion rate of 60% was exhibited.

Comparative Example 4

Styrene-butadiene rubber was prepared by the same method as that in Example 1 except that the pentamethylheptanethiol was added at the time at which a conversion rate of 5% was exhibited.

Experimental Example

In order to compare and analyze processing characteristics and mechanical properties of the respective nitrile-based copolymer rubbers prepared in Examples and Comparative Examples, Mooney viscosity, vulcanization characteristics, elongation (%), 300% modulus (%), tensile strength (kg·f/cm$^2$) and pollution degree were measured, and the results are shown in Table 1.

(1) Mooney Viscosity (MV) and C-MV

Mooney viscosity was measured with a Mooney viscometer (MV2000, Alpha Technologies). After preheating for 1 minute using a large rotor at 125° C., measurement values were obtained 4 minutes after the start of the rotor.

(2) Vulcanization Characteristics

Minimum torque ($M_L$) and maximum torque ($M_H$) values were measured with an MDR and differences between $M_H$ and $M_L$ were recorded, and Ts'1 (time required to reach 1% vulcanization), Ts'2 (time required to reach 2% vulcanization), Tc'50 (time required to reach 50% vulcanization), and Tc'90 (time required to reach 90% vulcanization) were measured. Herein, Tc'90 indicates the vulcanization rate. $M_H$ values according to time in Example 3 and Comparative Example 1 are shown in graph in FIG. 1.

(3) Mechanical Characteristics elongation (ε%) The respective nitrile-based copolymer rubbers were vulcanized for 45 minutes at 145° C., and then elongation (ε%) of the vulcanized samples was measured.

strengths (kg·f/cm$^2$): The respective nitrile-based copolymer rubbers were vulcanized at 145° C., and then tensile strengths (kg·f/cm$^2$) of 300% vulcanized samples were measured.

300% modulus: The respective nitrile-based copolymer rubbers were vulcanized for 45 minutes at 145° C., and then modulus at 300% elongation was measured.

In Table 1 above, PMHT indicates pentamethylheptanethiol, MV indicates Mooney viscosity, c-MV indicates Mooney viscosity after vulcanization, MDR indicates moving die rheometer, 300% M indicates 300% modulus, and the added amount indicates weight % based on the total added amount of the molecular weight modifier.

Referring to Table 1 above, it could be found that the styrene-butadiene rubbers prepared according to Examples 1 to 6 exhibited superior tensile characteristics and modulus.

On the other hand, it could be found that the styrene-butadiene rubber prepared according to Comparative Example 1 exhibited a low modulus because pentamethylheptanethiol was not used as the molecular weight modifier.

Meanwhile, in the case of Comparative Example 2 in which more than a suitable amount of pentamethylheptanethiol was added as a molecular weight modifier, additional improvement in physical properties of the styrene-butadiene rubber was not observed, and thus it could be found that it was preferable to properly adjust the added amount of pentamethylheptanethiol, which is relatively expensive.

Also, in the case where the time of addition of the pentamethylheptanethiol was too late as in Comparative Example 3, the Mooney viscosity of the styrene-butadiene rubber was increased such that a gel was generated and the elongation was lowered, and due to the lowered elongation, the physical properties of the rubber deteriorated to such a degree that it was impossible to measure the modulus at 300% elongation. Moreover, in the case where the time of addition of the pentamethylheptanethiol was too early in Comparative Example 4, it could be found that the tensile strength and the modulus at 300% elongation were lowered.

In addition, referring to FIG. 1, since the preparation method for styrene-butadiene rubber of Example 3 includes pentamethylheptanethiol as a molecular weight modifier, it could be found that the maximum torque ($M_H$) value of the prepared styrene-butadiene rubber was higher than that of the styrene-butadiene rubber prepared according to Comparative Example 1 which did not include pentamethylheptanethiol as a molecular weight modifier.

The invention claimed is:

1. A method for preparing styrene-butadiene rubber (SBR), the method comprising a polymerization in an emulsion state by using a composition including 1) a styrene-based monomer; 2) a butadiene-based monomer; and 3) a

TABLE 1

(amount: parts by weight)

| | PMHT added | | | | Vulcanization characteristic | | | | | | Secondary physical property Vulcanization (160° C., 15 min) | | |
|---|---|---|---|---|---|---|---|---|---|---|---|---|---|
| | Added amount (Wt %) | Time of addition (Conv. rate, %) | MV | C-MV | $M_L$ | $M_H$ | Ts'1 | Ts'2 | Tc'50 | Tc'90 | TS | ε (%) | 300% M |
| EX. 1 | 10 | 15 | 49.5 | 96.6 | 2.56 | 19.3 | 2.1 | 3.52 | 6.12 | 12.57 | 259.5 | 374.1 | 191.1 |
| EX. 2 | 10 | 30 | 51.1 | 97.1 | 2.55 | 19.6 | 2.04 | 3.55 | 6.13 | 12.44 | 262.3 | 377.4 | 192.9 |
| EX. 3 | 10 | 45 | 49.2 | 97 | 2.54 | 19.92 | 1.84 | 3.21 | 6.10 | 12.00 | 265.5 | 380.2 | 195.5 |
| EX. 4 | 10 | 50 | 50.2 | 98.9 | 2.56 | 18.92 | 2.41 | 3.95 | 6.99 | 13.34 | 255.1 | 360.4 | 192.4 |
| EX. 5 | 5 | 15 | 49.2 | 95.9 | 2.54 | 19.13 | 2.11 | 3.72 | 6.65 | 12.85 | 258.5 | 388.7 | 188.1 |
| EX. 6 | 30 | 15 | 51.2 | 97.2 | 2.64 | 20.51 | 1.91 | 3.54 | 6.23 | 12.55 | 262.1 | 378.2 | 194.4 |
| CE. 1 | — | — | 49.4 | 94 | 2.53 | 18.87 | 2.42 | 3.99 | 7.02 | 13.54 | 257.2 | 400.5 | 180.5 |
| CE. 2 | 40 | 15 | 45.7 | 90.3 | 2.24 | 19.08 | 1.92 | 3.48 | 6.14 | 12.34 | 254.1 | 392.4 | 191.2 |
| CE. 3 | 10 | 60 | 53.4 | 100.3 | 2.55 | 19.6 | 2.04 | 3.55 | 6.13 | 12.44 | 262.3 | 280.3 | — |
| CE. 4 | 10 | 5 | 50.2 | 97.0 | 2.55 | 19.01 | 2.15 | 3.74 | 6.7 | 12.94 | 257.8 | 384.5 | 189.1 |

*Con. rate: Conversion rate, EX.: Example, CE.: Comparative Example molecular weight modifier comprising t-dodecylmercaptan and pentamethylheptanethiol (PMHT), wherein the t-dodecylmercaptan and the pentamethylheptanethiol are included in a weight ratio of 70:30 to 95:5, wherein the t-dodecylmercaptan is prepared from propene, and the pentamethylheptanethiol is prepared from isobutene, the t-dodecylmercaptan is added to the polymerization before the pentamethylheptanethiol is added thereto, and the pentamethylheptanethiol is added at the time when the polymerization exhibits a conversion rate of 10% to 55%.

2. The method of claim 1, wherein the pentamethylheptanethiol comprises at least one selected from the group consisting of 2,2,4,6,6-pentamethylheptane-4-thiol, 2,4,4,6,6-pentamethylheptane-2-thiol, 2,3,4,6,6-pentamethylheptane-2-thiol, and 2,3,4,6,6-pentamethylheptane-3-thiol.

3. The method of claim 1, wherein the pentamethylheptanethiol comprises the 2,2,4,6,6-pentamethylheptane-4-thiol in an amount of 65 mol % or more based on a total mole number of the pentamethylheptanethiol.

4. The method of claim 1, wherein the t-dodecylmercaptan and the pentamethylheptanethiol are included in a weight ratio of 80:20 to 95:5.

5. The method of claim 1, wherein the molecular weight modifier comprises the 2,2,4,6,6-pentamethylheptane-4-thiol in an amount of 5 mol % or more based on a total mole number of the molecular weight modifier.

6. The method of claim 1, wherein the composition comprises the molecular weight modifier in an amount of 0.05 to 2 parts by weight based on 100 parts by weight of the composition.

7. Styrene-butadiene rubber which is prepared by the method of claim 1 and has a tensile strength (TS) ranging from 250 kg·f/cm$^2$ to 300 kg·f/cm$^2$, and a tensile elongation (c) ranging from 370% to 400%.

8. The styrene-butadiene rubber of claim 7, wherein the 300% modulus value of the styrene-butadiene rubber is 190 to 200.

* * * * *